United States Patent [19]

Narita et al.

[11] Patent Number: 5,100,743
[45] Date of Patent: Mar. 31, 1992

[54] INTERNAL REFORMING TYPE MOLTEN CARBONATE FUEL CELL

[75] Inventors: Sanyu Narita; Jitsuji Otsuki; Hiroshi Tahara, all of Osaka; Masayuki Miyazaki; Tatsunori Okada, both of Amagasaki; Toshihide Tanaka; Enju Nishiyama, both of Amagasaki, all of Japan

[73] Assignees: Kansai Electric Power Co., Inc., Osaka; Mitsubishi Denki Kabushiki Kaisha, Tokyo, both of Japan

[21] Appl. No.: 639,267

[22] Filed: Jan. 10, 1991

[30] Foreign Application Priority Data

Jan. 11, 1990 [JP] Japan ................................ 2-5344

[51] Int. Cl.$^5$ .............................................. H01M 8/14
[52] U.S. Cl. ........................................ 429/19; 429/16
[58] Field of Search .................... 429/19, 16, 17, 12, 429/34, 41

[56] References Cited

U.S. PATENT DOCUMENTS

| 4,647,516 | 3/1987 | Matsumura et al. | 429/19 |
| 4,774,152 | 9/1988 | Matsumura et al. | 429/12 |
| 4,895,774 | 1/1990 | Ohzu et al. | 429/16 X |
| 4,902,587 | 2/1990 | Saitoh et al. | 429/16 X |

FOREIGN PATENT DOCUMENTS 1100867 1/1989 Japan.

Primary Examiner—Anthony Skapars
Attorney, Agent, or Firm—Leydig, Voit & Mayer

[57] ABSTRACT

A internal reforming type molten carbonate fuel cell is provided in which the process or flow direction of the reforming reaction of a raw fuel gas in the reforming reaction section is countercurrent to the flow direction of the oxidant gas in the cell reaction section. Therefore, a temperature difference in the fuel cell can be suppressed.

3 Claims, 11 Drawing Sheets

INTERNAL REFORMING TYPE MOLTEN CARBONATE FUEL CELL

BACKGROUND OF THE INVENTION

1. Field of the Invention

The present invention relates to an internal reforming type molten carbonate fuel cell, more particularly to an improved fuel cell which improves a method of supplying fuel gas to a cell stack.

2. Description of the Related Art

A fuel cell is a cell which is capable of providing direct current produced by the reaction of a readily oxidized gas such as hydrogen with an oxidizing gas such as oxygen through an electrochemical process.

The fuel cells are classified broadly according to their electrolyte into a phosphoric acid type, a molten carbonate type and a solid electrolytic type.

An outline of the constitution of the molten carbonate type fuel cell is described below:

The molten carbonate fuel cell has a fuel cell stack in which a plurality of single cells are piled up with separators interposed respectively therebetween, the separators being formed with fuel gas passages and oxidant gas passages, respectively crossing each other at right angles on the respective surfaces thereof. The single cell is comprised of a pair of gas diffusion electrodes and a molten carbonate electrolytic layer interposed between the electrodes. In this way in the molten carbonate fuel cell, applying the conventional process, $H_2$ and CO are produced from raw fuel (for example, from various hydrocarbons, primarily methane), and become activated through an electrochemical reaction at the anode. The conventional types are generally classified into two types of the fuel cells, namely, an internal reforming type and an external or outer reforming type. In the external reforming type cell, hydrogen to be consumed as raw fuel in the fuel cell is generated from a hydrocarbon outside the fuel cell stack.

The internal reforming type cell is a type of the fuel cell which is capable of performing a reforming reaction and an electrochemical reaction simultaneously inside the fuel cell stack. The reforming reaction is to generate hydrogen and carbon monoxide from the hydrocarbon, to be consumed as raw fuel in the fuel cell. The internal reforming type cell is characterized in that a combination of an endothermic reforming reaction and an exothermic fuel cell reaction is utilized to compensate for excess or deficiency in the amount of heat. Accordingly, a fuel cell power generating system provided with the internal reforming type cell can readily attain higher efficiency of power generation as well as more effective use of heat, compared to the conventional power generating system provided in the outer reforming type fuel cell. The internal reforming type cells are mainly classified into a direct internal reforming type and an indirect internal reforming type according to their structure and characteristics. In the direct internal reforming type cell, reforming catalyst is placed in a gas channel at a fuel gas side electrode (anode) and a reforming reaction and an electrode reaction proceed simultaneously.

On the other hand, the indirect internal reforming type cell is provided with a reforming section at an area which is separated from and thermally adjacent to the fuel gas channel. Such arrangement can allow the heat of formation at the fuel cell to be utilized as reaction heat for reforming, so that reforming and electrode reactions can proceed independently.

In the direct internal reforming type cell, a fuel gas channel holds a reforming catalyst, and a reforming reaction taken place directly in the cell. The most severe problem inherent in a cell structure of this type is the poisoning of the reforming catalyst caused by an electrolyte held in the fuel gas electrode. For eliminating such a defect, there is provided an indirect internal reforming type cell in which the reforming reaction is separated from the electrode reaction. In this type of the cell, indirect reformers are piled up with cell units of several single cells interposed respectively therebetween to form a cell stack.

FIGS. 8 to 10 show a conventional indirect internal reforming type molten carbonate fuel cell disclosed in Japanese Patent Application No.01-185256 by the same applicant. There is shown in FIG. 8 a partial cutaway view of a manifold specifically used for supplying raw fuel 6 (for example, natural gas such as methane). In this type of the cell, an indirect reformer 8 is interposed between the several single cells 1a and 1b to form a fuel cell stack. FIG. 9 shows a schematic perspective view of the fuel cell stack 3 with manifolds 11 and 12 removed, the manifolds being used for supplying raw fuel gases 6a to 6d or an oxidant or oxidizing gas 9 to the fuel cell body as illustrated in FIG. 8. In this view, the fuel side (anode side) of the separator 2 incorporated with an indirect reformer 8 is partially cut away. The plane indirect reformer 8 is disposed in the separator 2 and it is piled with single cells 1a to 1c and 1d to 1e, on opposite surfaces, respectively to form the fuel cell stack 3. The single cells include components such as electrodes and the like. As is shown in FIGS. 8 and 9, gases from the oxidant side (cathode side) and the fuel gas side (anode side) are supplied to the cell body through the manifold 11 (cathode side) and the manifold 12 (anode side). These manifolds 11 and 12 are mounted on the cell body with a coil spring 13. The cell body is maintained at constant temperature with a flat heater 14. Reforming catalyst in the indirect reformer 8 is held with a wave form board, namely a corrugated fin. Raw fuel gas, or carbohydrate gas 6 such as methane is introduced into the reformer 8 through an opening 80a formed at one side of a cell stack 3. The raw fuel gas 6, supplied from a channel of a raw gas 8a is reformed at a reforming reaction section 8b and released from an opening (not shown) formed at the same plane where the opening 80a is formed. FIG. 10 shows a horizontal sectional view of the indirect reformer 8 illustrated in FIGS. 8 to 9. In this figure, the reforming reaction section 8b is provided with an opening 80b which is opposite to the opening 80a in the raw fuel gas channel 8a. The section 8b is also provided with a manifold 12a which supplies the raw fuel gas 6 to the raw fuel gas channel 8a. Fuel gas 7 released from the reforming reaction section 8b is distributed through a distributing manifold 12b into the fuel gas channels of the single cells respectively. The reformer 8 is separated into the raw fuel gas channel 8a and the reforming reaction section 8b by a partition plate 16. The reformer 8 is also provided with a raw fuel gas return section 17 to introduce raw fuel gas 6 into a section filled with catalyst for formation of hydrogen-rich reforming gas. Numerals, 18a and 18b, illustrated with hatching denote wet seals which are gas seals interposed between the cell layers. Numeral 11 denotes a fuel gas after a fuel cell reaction. A raw fuel manifold 12 is made up of a raw fuel gas supply manifold 12a and a fuel gas distributing manifold 12b which are mounted on one side of the cell stack across a plurality of single cells.

With reference to FIG. 10, gas flow of the conventional indirect internal reforming type molten carbonate fuel cell will be explained. The raw fuel gas 6 to be supplied to a cell stack from outside is supplied from the manifold 12a mounted on the the side of the cell body to the indirect reformer 8. In the interior of the reformer 8, the raw fuel gas 6 flows to the gas return section 17 through the raw fuel gas channel 8a having no reforming catalyst 5. The direction of the raw fuel gas 6 flow is then changed and the gas 6 is introduced into the reforming reaction section 8b having the reforming catalyst 5. Then a hydrogen-rich reforming gas, namely, a fuel gas 7 is generated. The fuel gas formed 7 is supplied to the respective channels in the anode side of the cells of the cell body through the fuel gas distributing manifold 12b, and the cell reaction occurs when an oxidant gas 9 such as air is supplied to the channels in the cathode side. The indirect internal reforming type molten carbonate fuel cell has a structure in which the reaction proceeding in the direction of the flow of the raw fuel gas 6 in the reforming reaction surface is a cross-flow to the flow of the oxidant gas 9 in the area of the cell reaction surface respectively.

FIGS. 11 and 12 show respectively experimental measurements of temperature distribution of the interiors of the indirect reformer and the fuel cell in the conventional indirect internal reforming type molten carbonate fuel cells during steady-state operation. In the interior of the indirect reformer, average temperature is 622° C., maximum temperature 678° C., and minimum temperature 493° C. In the interior of the cell, average temperature is 643° C., maximum temperature 682° C. and minimum temperature 566° C. The reforming reaction to form hydrogen from raw fuel gas (methane) by the use of the reforming catalyst is an endothermic reaction, whereas the cell reaction in the cell body is an exothermic reaction. The oxidant gas generally employs air which is allowed to include approximately 15% of the oxidant gas with its temperature cooled to approximately 550° C., which is lower than that of the cell interior. Accordingly, the temperature distribution of the cell interior is as follows: approximately 200° C. at the reformer, approximately 120° C. at the cell body.

The conventional internal reforming type molten carbonate fuel cells have a construction as described above, the process direction of the endothermic reforming reaction crosses the direction of flow of the oxidant gas at a right angle for effectively cooling the cell reaction surface, causing a large temperature difference at the cell reaction surface and thereby exerting adverse effect upon the stability of cell operation.

SUMMARY OF THE INVENTION

In view of the foregoing, the object of the invention is to provide an internal reforming type molten carbonate fuel cell which can decrease temperature difference during steady-state operation and has excellent stability during cell operation. This object is attained by providing an internal reforming type molten carbonate fuel cell comprising: a cell reaction section having a fuel electrode, an oxidant electrode and electrolyte matrix interposed therebetween for generating electricity by suppying a fuel gas and an oxidant gas to the fuel electrode and the oxidant electrode, respectively; and a reforming reaction section for reforming a raw fuel gas to the fuel gas, wherein the process direction of the reforming reaction of raw fuel gas in the reforming reaction section is countercurrent to the flow direction of the oxidant gas in the cell reaction section.

DESCRIPTION OF THE PREFERRED EMBODIMENTS

According to a first embodiment of an internal reforming type molten carbonate fuel cell in the present invention, the proceeding or process direction of the reforming reaction of a raw fuel gas at a reforming reaction section is countercurrent to the flow direction of an oxidant gas at a cell reaction section.

According to a second embodiment of an internal reforming type molten carbonate fuel cell in the present invention, the process direction of the reforming reaction of a raw fuel gas at a reforming reaction section is countercurrent to the flow direction of an oxidant gas at a cell reaction section. At the same time, the process direction of the reforming reaction of a raw fuel gas is orthogonal to the flow direction of the fuel gas in the reforming reaction section.

In an internal reforming type molten carbonate fuel cell in the present invention, a reforming reaction having a cooling effect proceeds oppositely to the direction of a oxidant gas flow thereby suppressing temperature differences of interior of the fuel cell.

When the fuel gas flow is orthogonal the process direction of the reforming reaction, a manifold for supplying respective gases would be readily mounted on the fuel cell. In addition, the process direction of the exothermic cell reaction is allowed to be orthogonal to both the process direction of the reforming reaction and the flow direction of the oxidant gas, both having cooling effects. In the neighborhood of an inlet of the oxidant gas and an inlet of the raw fuel gas, heat generation can occur by the reaction of the fuel gas having the same concentration. Accordingly, temperature distribution of the areas can be uniform, compared to the temperature distribution when a fuel gas having different concentrations is reacted.

The oxidant gas employs a 15% oxygen content air and its oxygen utilization is extremely low, whereby the oxygen content does not change and remains approximately 12% even near the oxygen gas outlet. On the other hand, the fuel gas has higher hydrogen utilization. When the hydrogen content is high, for example, approximately 80% near the oxidant gas inlet, it decreases in general to 16% near the oxidant gas outlet. Accordingly, it is considered that the amount of cell reaction, namely, the amount of exothermic reaction is not greatly affected by the oxidant gas flow and gradually changes according to the fuel gas flow.

Figure 1:
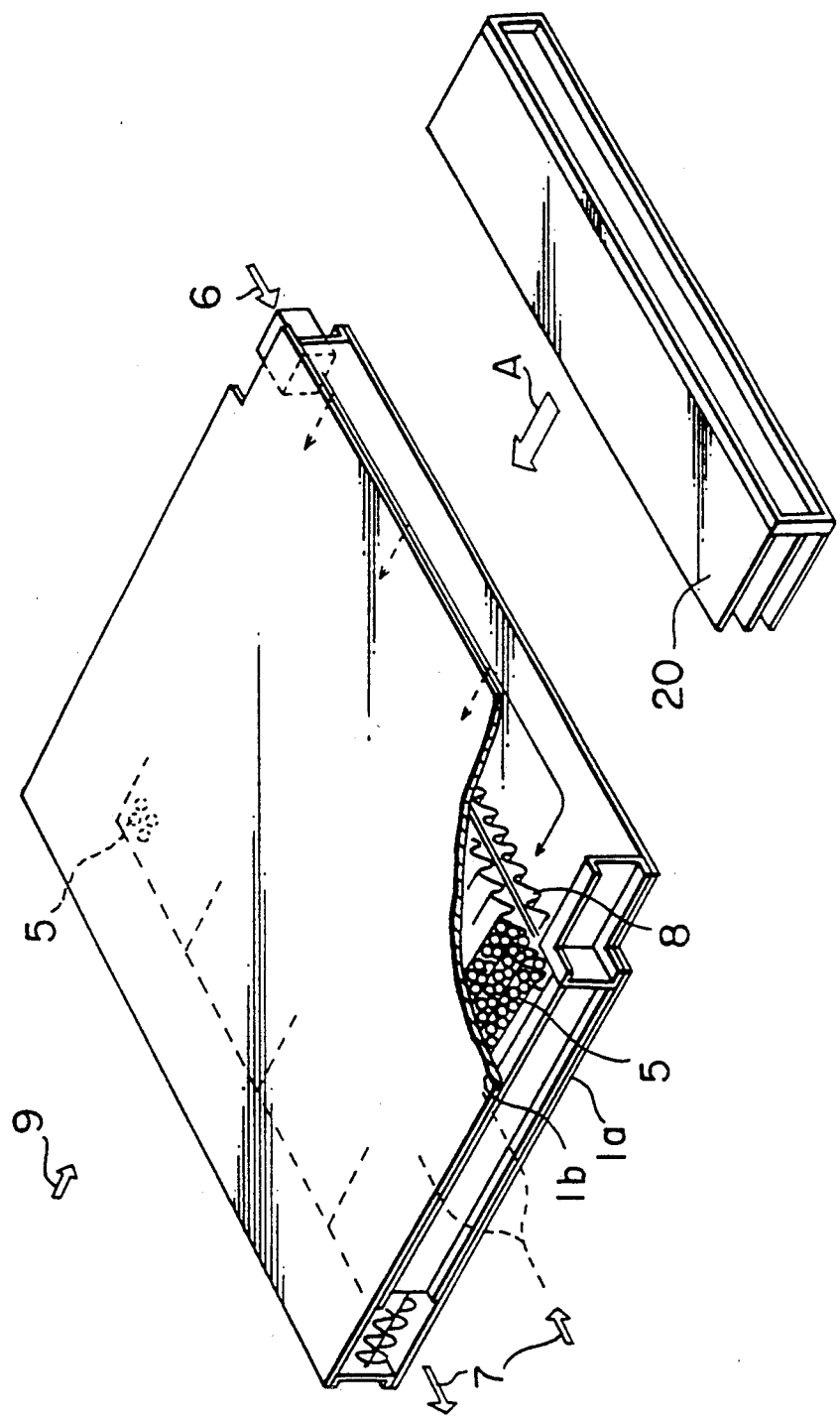
FIG. 1 is an exploded perspective and partly broken away view of an internal reforming type molten carbonate fuel cell of a first embodiment of the present invention.

Referring now to the drawings for a more detailed understanding of the first embodiment, FIG. 1 is an exploded perspective and partly broken away view of the indirect internal reforming type molten carbonate fuel cell of the first embodiment of the internal reforming type molten carbonate fuel cell in accordance with the present invention. In this drawing, numeral 20 donates a raw fuel gas distributing section which will be inserted between single cells 1a and 1b during assembly of the fuel cell. The raw fuel gas 6 supplied from a side perpendicular to an oxidant gas flow 9 changes its direction in the fuel gas distributing section 20 and flows oppositely to the oxidant gas flow through and among reforming catalyst 5. The raw fuel gas 6 is reformed to the fuel gas 7 by reforming reaction. This fuel gas 7 is supplied to the single cells 1a and 1b arranged to be orthogonal to both the oxidant gas 9 flow and process direction of the reforming reaction.

Figure 2A:
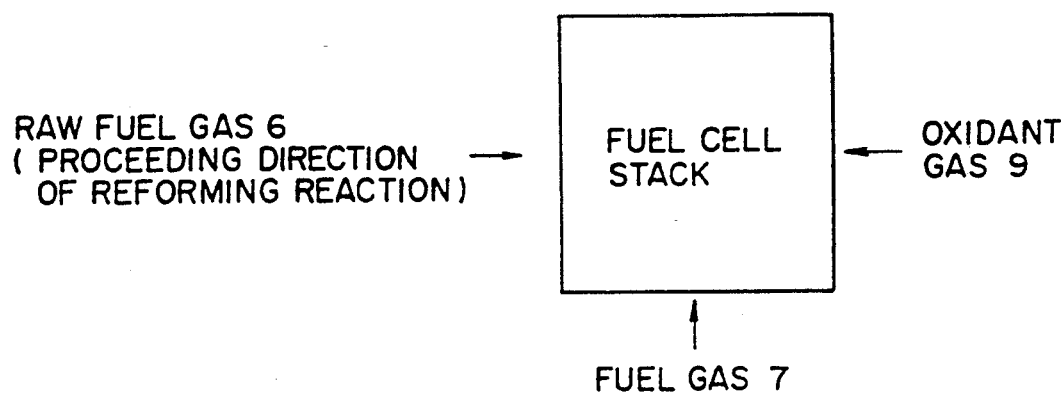
FIGS. 2A and 2B are schematic views illustrating the respective gas flows of the first embodiment of the present invention and of a conventional indirect internal reforming type molten carbonate fuel cell respectively.
Figure 2B:
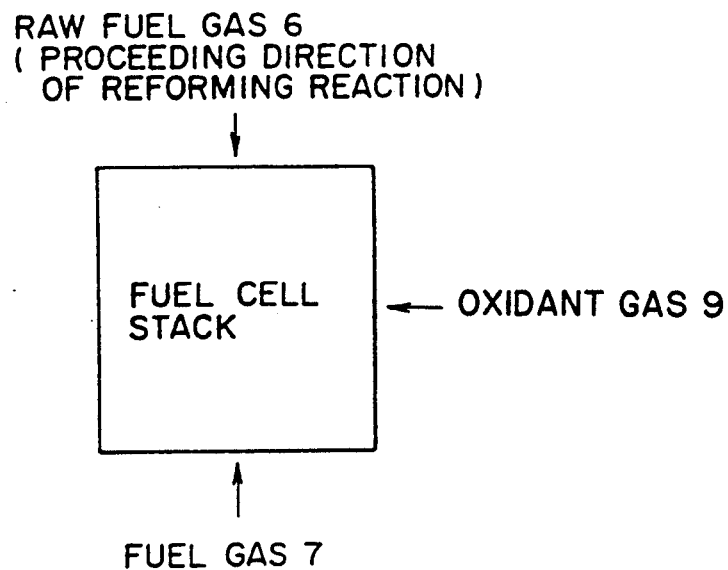
Figure 3:
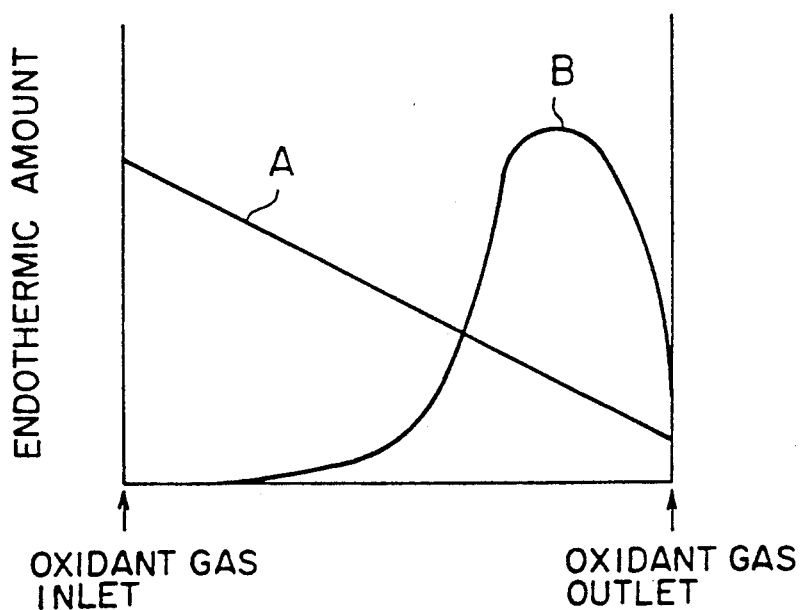
FIGS. 3 and 4 are views illustrating the changes in endothermic amounts of an oxidant gas and a reforming reaction, and temperature distribution respectively between an inlet and an outlet of an oxidant gas in the first embodiment of this invention.
Figure 4:
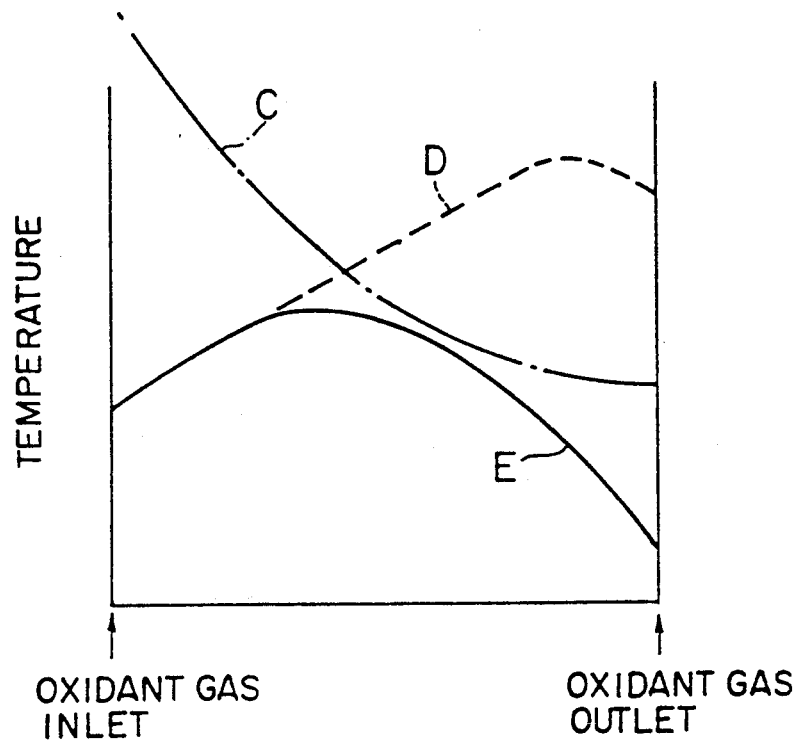
Figure 10:
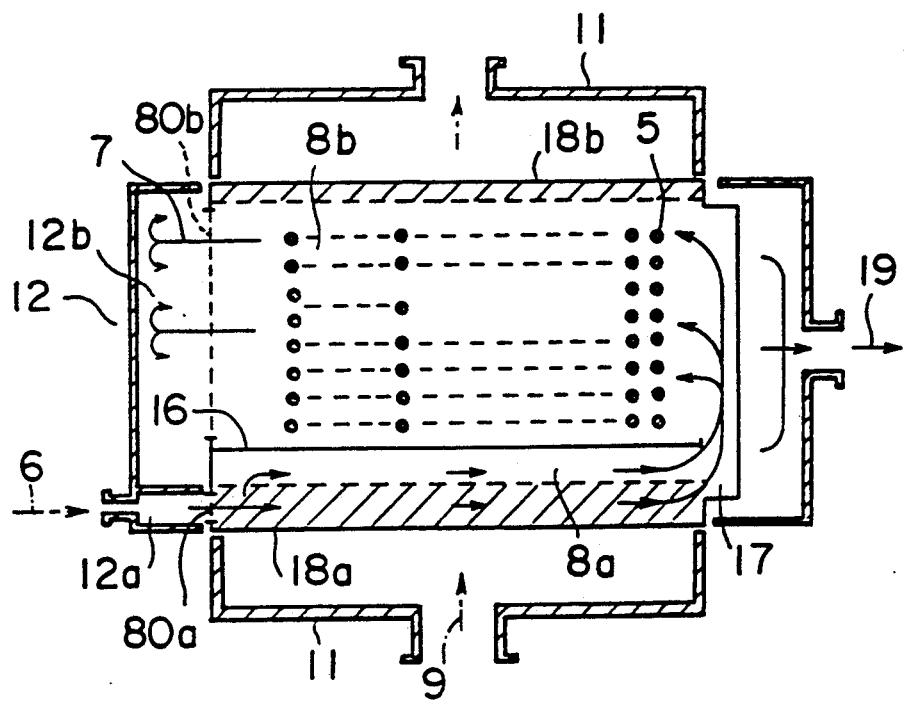
FIG. 10 is a sectional view of the indirect reformer illustrated in FIG. 8.
Figure 11:
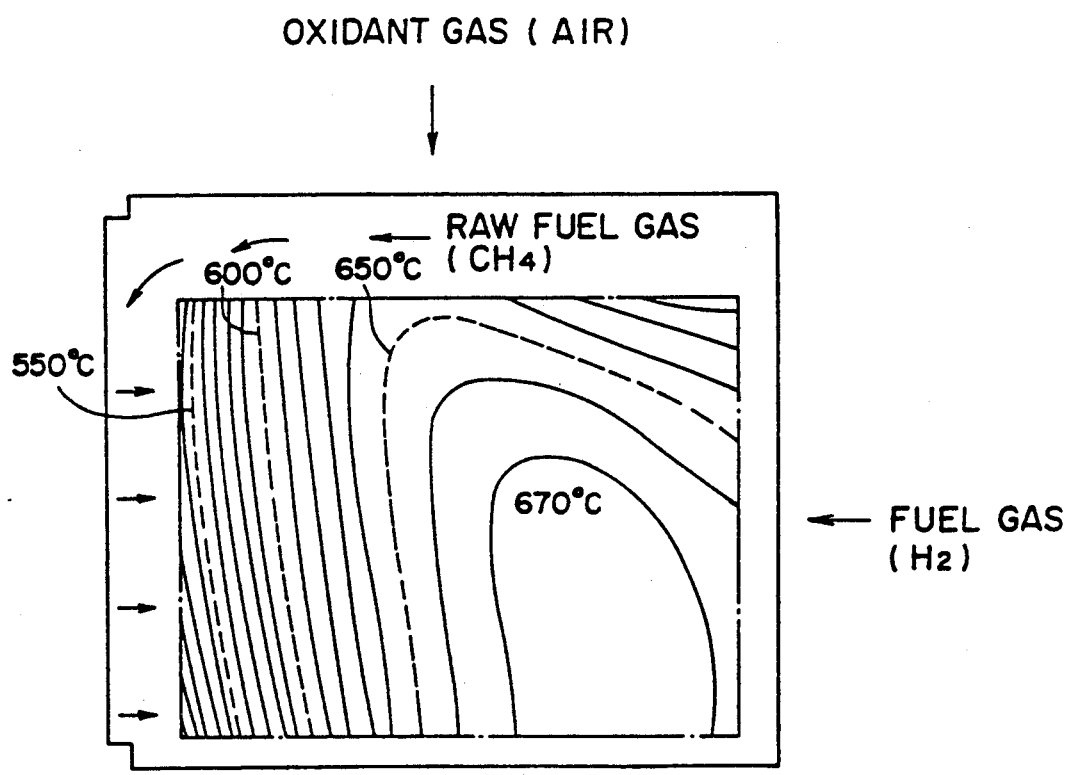
FIGS. 11 and 12 are views illustrating experimental measurements of temperature distributions of the interiors of the reformer and the cell respectively in the conventional fuel cell during steady-state operation.
Figure 12:
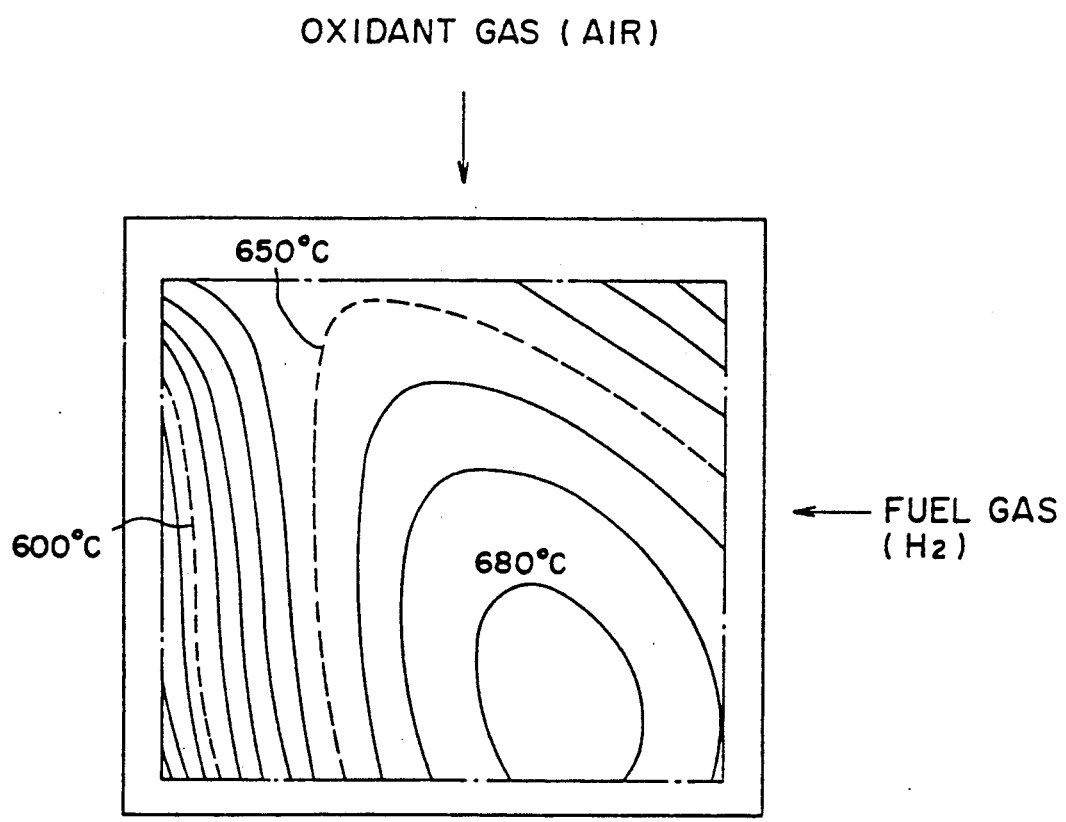

FIG. 2A is a schematic view illustrating the respective gas flows of the first embodiment of the present invention as shown in FIG. 1, and FIG. 2B is a schematic view illustrating the respective gas flows of a conventional indirect internal reforming type molten carbonate fuel cell as shown in FIG. 10. FIG. 2A shows that the proceeding direction of the reforming reaction is countercurrent to the oxidant gas flow. Therefore, a combination of the endothermic reforming reaction and the oxidant endothermic action is utilized to cool the cell from opposite directions. FIG. 3 illustrates changes in endothermic amounts of the oxidant gas (depicted by "A") and reforming reaction ("B") between an inlet and an outlet of the oxidant gas of the fuel cell. FIG. 4 shows temperature distribution of the cell between the inlet and the outlet of the oxidant gas of the fuel cell. In the FIG. 4, curves C, D and E represent temperatures only during cooling by reforming reaction, only during cooling by oxidant gas and cooling by a combination of oxidant gas and reforming reaction, respectively. As will be seen in the FIGS. 3 and 4, the temperature distribution can be uniform inside the cell. A heat exchanging field, namely, a heat exchanging quantity inside the cell is represented by the following equation.

$$Q = a \cdot \Delta T$$

Where, $a$ represents the thermal conductivity and $\Delta T$ represents the temperature difference. The thermal conductivity $a$ must be increased in order to suppress the temperature difference $\Delta T$ by cooling effect merely by the oxidant gas. Consequently, the oxidant gas amount must be increased. On the other hand, in the present invention, the oxidant gas flow is orthogonal to the process direction of the reforming reaction. It is noted that a combination of cooling effects of the oxidant gas and the reforming reaction is utilized to decrease the heat exchanging quantity thereby decreasing the oxidant gas amount. When the oxidant gas flow is not decreased, the temperature difference $\Delta T$ can become small.

According to another embodiment of the present invention, the process or flow direction of the reforming reaction is countercurrent to the oxidant gas flow, at the same time, the fuel gas flow direction (namely, the flow direction of the cell reaction) is orthogonal to the above two directions, whereby the manifold can be readily mounted to a cell body and temperature distribution can be suppressed.

Figure 5:
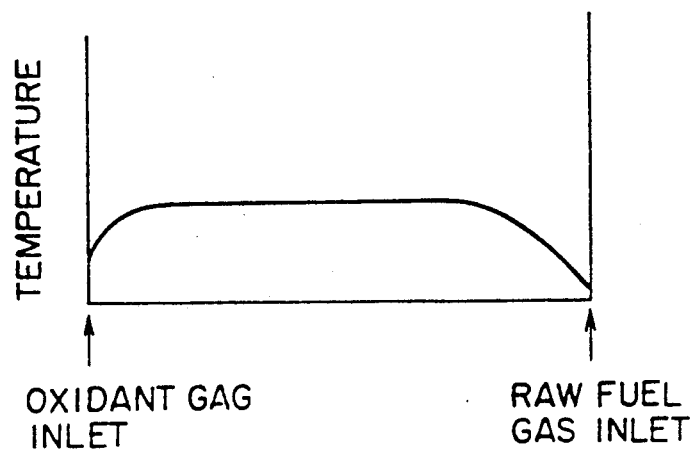
FIG. 5 is an illustration of temperature distribution between inlets of a raw fuel gas and an oxidant gas as observed when only the raw fuel gas and the oxidant gas are supplied to the fuel cell of the first embodiment.

When the raw fuel gas and the oxidant gas are supplied to the fuel cell without conducting the cell reaction, temperature decreases drastically, as illustrated in FIG. 5, in the neighborhood of the inlets of the raw fuel gas and the oxidant gas since only heat release and absorption to the surroundings occur. Accordingly, unless the cell reaction is at least uniformly conducted near the above inlets, the temperature of the cell interior cannot be well balanced. For eliminating this disadvantage, the fuel gas is allowed to flow orthogonal to the raw fuel gas as well as the oxidant gas. Therefore, heat generation occurs by the reaction of the fuel gas having the same concentration in the neighborhood of the above inlets, and the temperature distribution can be uniformly maintained.

On the other hand, in the conventional fuel cell as shown in FIG. 2B, the process or flow direction of a reforming reaction is orthogonal to an oxidant gas flow, therefore, the temperature distribution cannot be uniformly maintained due to an unbalanced distribution of cooling amount at cell surfaces. In addition, the cell reaction proceeding direction, namely, the fuel gas flow direction, is countercurrent to the reforming reaction process direction in which the cell reaction is exothermic and the reforming reaction has a cooling effect. Accordingly, it is considered that there is created a large temperature difference between neighborhoods of the inlet and outlet of the fuel gas.

Computer simulation was conducted in a steady-state cell operation on the two indirect internal reforming type molten carbonate fuel cells as shown in FIGS. 2A and 2B. The computation conditions are as follows:

| | |
|---|---|
| (1) Average electric current density | 150 mA/cm$^2$ |
| (2) Fuel utilization | 60% |
| (3) Oxidant utilization | 20% |
| (4) Effective electrode area | 5000 cm$^2$ |
| (5) Number of cells | 6 cells |
| (6) Reformer | placed on the upper and lower sides of the 6 cells |
| (7) Endothermic amt. of the reformer | 770K cal/hr |

Figure 6:
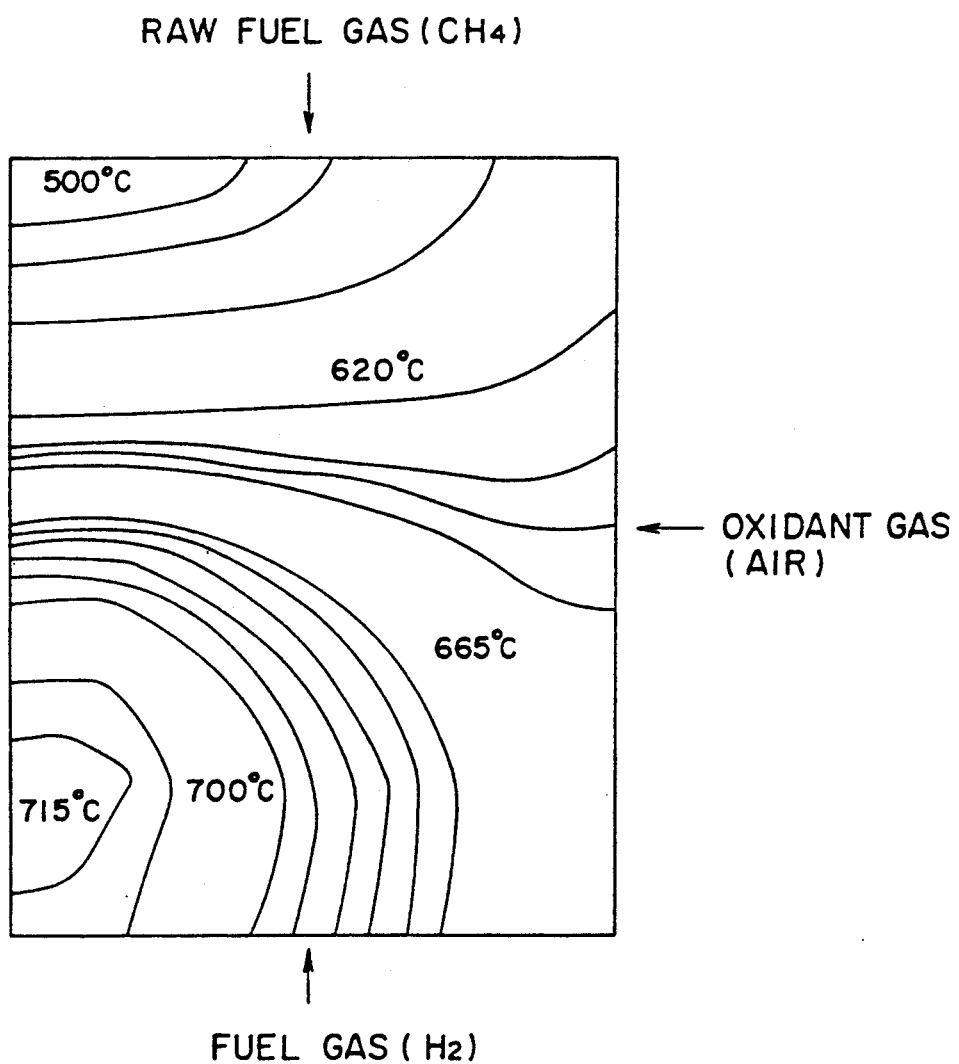
FIGS. 6 and 7 are views illustrating temperature distributions of the interiors of the reformers in the conventional fuel cell and the first embodiment respectively by computer simulation.
Figure 7:
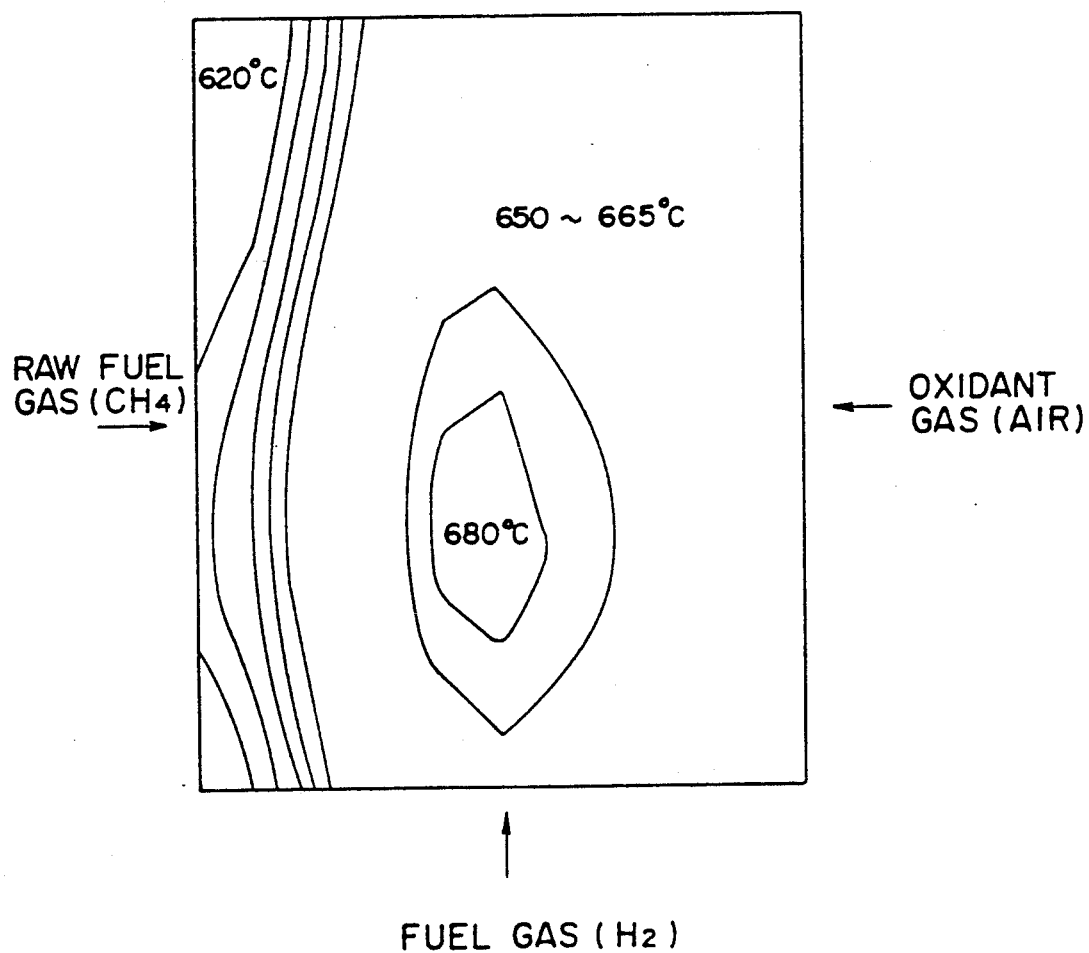
Figure 8:
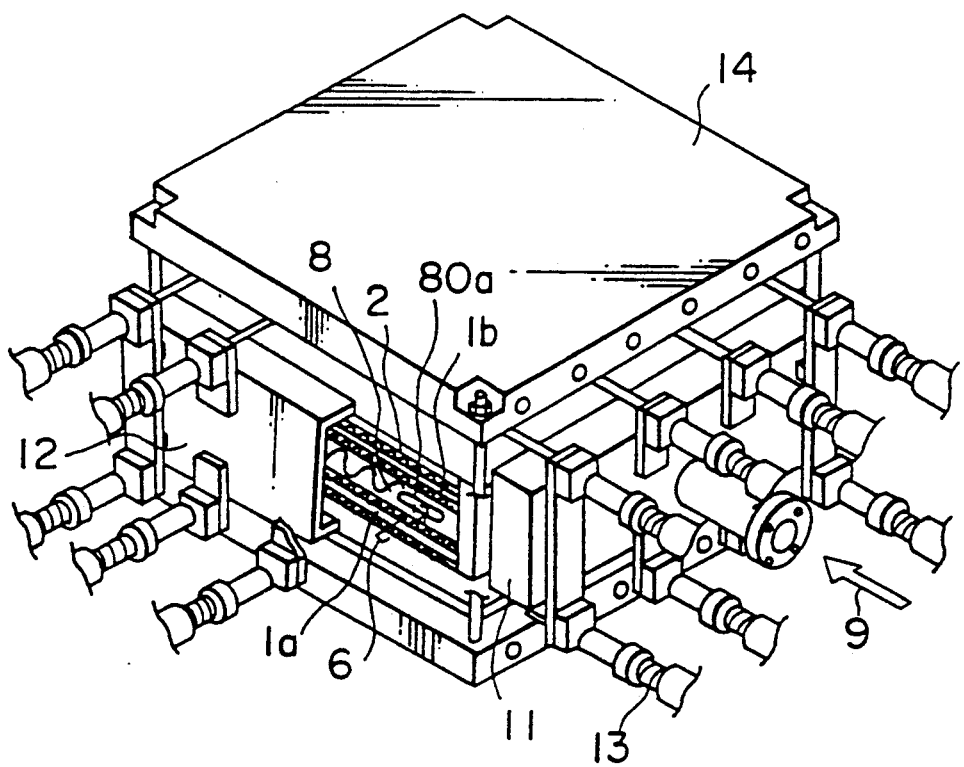
FIG. 8 is a schematic perspective view of the conventional internal reforming type molten carbonate fuel cell with its manifold partly broken away.
Figure 9:
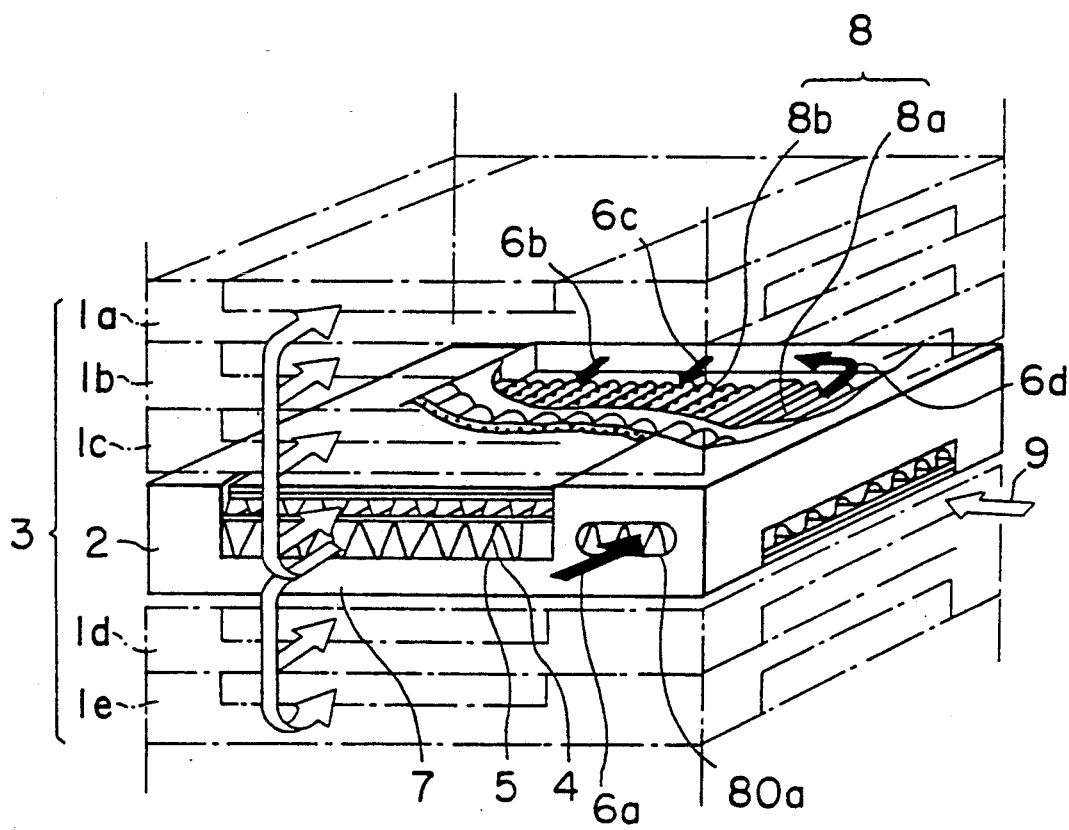
FIG. 9 is a schematic perspective view of a fuel cell stack as shown in FIG. 8.

The results are shown in the table and FIGS. 6 and 7. Temperature difference at the interiors of the reformer and the cells is advantageously relatively smaller in the fuel cell according to the present invention in comparison with the conventional fuel cell. It is expected that average cell voltage will become high.

TABLE

Comparison of Temperature Distribution

|  |  | FIG. 2A Examp. 1 | FIG. 2B Comp. Examp. 1 |
|---|---|---|---|
| Reformer Interior Temperature (°C.) | Maximum | 716 | 697 |
|  | Minimum | 510 | 478 |
|  | Average | 636 | 616 |
| Cell interior Temperature (°C.) | Maximum | 722 | 700 |
|  | Minimum | 536 | 514 |
|  | Average | 646 | 625 |
| Fuel Gas Temperature (°C.) | Inlet | 600 | 600 |
|  | Outlet | 558 | 678 |
| Oxidant Gas Temperature (°C.) | Inlet | 630 | 630 |
|  | Outlet | 653 | 618 |
| Cell Current Density (mA/cm$^2$) | Maximum | 256 | 207 |
|  | Minimum | 19 | 100 |
| Average Cell Voltage (V) |  | 0.74 | 0.75 |

In the above embodiments, the indirect internal reforming type molten carbonate fuel cells were explained, however, the present invention can also be applied to the direct internal reforming type molten carbonate fuel cell. It is clear that the same effects of the above embodiment can also be obtained.

What is claimed is:

1. An internal reforming type molten carbonate fuel cell comprising:

a cell reaction section having a fuel electrode, an oxidant electrode and electrolyte . matrix interposed therebetween for generating electricity by supplying a fuel gas and an oxidant gas to said fuel electrode and said oxidant electrode, respectively; and a reforming reaction section for reforming a raw fuel gas to said fuel gas, wherein the process direction of the reforming reaction of said raw fuel gas in said reforming reaction section is countercurrent to the flow direction of said oxidant gas in said cell reaction section.

2. A fuel cell as claimed in claim 1 wherein said process direction of the reforming reaction of said raw fuel gas is orthogonal to the flow direction of said fuel gas in said cell reaction section.

3. A fuel cell as claimed in claim 1 further comprising a gas distributing section for changing the flow derection of said raw fuel gas.

* * * * *